United States Patent
McNutt et al.

(10) Patent No.: US 10,649,876 B2
(45) Date of Patent: May 12, 2020

(54) MAINTAINING MANAGEABLE UTILIZATION IN A SYSTEM TO PREVENT EXCESSIVE QUEUING OF SYSTEM REQUESTS

(71) Applicant: International Business Machines Corporation, Armonk, NY (US)

(72) Inventors: Bruce McNutt, Tucson, AZ (US); Vernon W. Miller, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 15/492,748

(22) Filed: Apr. 20, 2017

(65) Prior Publication Data
US 2018/0307578 A1  Oct. 25, 2018

(51) Int. Cl.
*G06F 11/34* (2006.01)
*G06F 9/50* (2006.01)
(Continued)

(52) U.S. Cl.
CPC ........ *G06F 11/3452* (2013.01); *G06F 9/4881* (2013.01); *G06F 9/5038* (2013.01);
(Continued)

(58) Field of Classification Search
CPC ............ G06F 11/3006; G06F 11/3051; G06F 11/3452; G06F 9/4881; G06F 9/5038;
(Continued)

(56) References Cited

U.S. PATENT DOCUMENTS

| 7,475,399 B2 | 1/2009 | Arimilli et al. |
| 8,341,637 B2 | 12/2012 | Corry et al. |

(Continued)

FOREIGN PATENT DOCUMENTS

| CN | 101198141 A | 6/2008 |
| CN | 104618269 A | 5/2015 |

(Continued)

OTHER PUBLICATIONS

McNutt, B., U.S. Appl. No. 14/937,999, filed Nov. 11, 2015.
(Continued)

*Primary Examiner* — Wissam Rashid
*Assistant Examiner* — Willy W Huaracha
(74) *Attorney, Agent, or Firm* — Zilka-Kotab, P.C.

(57) ABSTRACT

According to one embodiment, a computer-implemented method includes obtaining, during a measurement period, a set of utilization metrics for a system; determining, whether the average number of outstanding system requests of the system lies between a current and an actual value of the maximum concurrency; in response to determining that the average number of outstanding system requests of the system does not lie between the current and actual values of the maximum concurrency, not adjusting the maximum concurrency value; in response to determining that the average number of outstanding system requests of the system does lie between the current and actual values of the maximum concurrency, assigning a value of the maximum concurrency to be the value of the average number of outstanding system requests; accessing a utilization function; solving the utilization function; and managing performance problems of the system indicated by solving the utilization function.

18 Claims, 4 Drawing Sheets

(51) Int. Cl.
*G06F 9/48* (2006.01)
*G06F 11/30* (2006.01)
*H04L 12/24* (2006.01)

(52) U.S. Cl.
CPC ...... *G06F 11/3006* (2013.01); *G06F 11/3051* (2013.01); *H04L 41/142* (2013.01); *H04L 41/5009* (2013.01); *H04L 41/5035* (2013.01)

(58) Field of Classification Search
CPC .............. H04L 41/142; H04L 41/5009; H04L 41/5035
See application file for complete search history.

(56) References Cited

U.S. PATENT DOCUMENTS

| | | | |
|---|---|---|---|
| 8,560,667 | B2 | 10/2013 | Kikuchi et al. |
| 8,667,120 | B2 | 3/2014 | Kurebayashi et al. |
| 2001/0054020 | A1 | 12/2001 | Barth et al. |
| 2002/0021686 | A1 | 2/2002 | Ozluturk et al. |
| 2004/0236757 | A1* | 11/2004 | Caccavale ............ G06F 11/3409 |
| 2005/0018611 | A1 | 1/2005 | Chan et al. |
| 2011/0022806 | A1 | 1/2011 | Wang et al. |
| 2011/0296463 | A1 | 12/2011 | Suslov |
| 2012/0023117 | A1 | 1/2012 | Butt et al. |
| 2013/0318283 | A1 | 11/2013 | Small et al. |
| 2014/0025823 | A1* | 1/2014 | Szabo .................... H04L 43/16 709/226 |
| 2014/0201360 | A1 | 7/2014 | Marshall |
| 2015/0234677 | A1 | 8/2015 | Bartley et al. |
| 2016/0036656 | A1* | 2/2016 | McNutt ............... G06F 11/3485 709/224 |
| 2019/0236150 | A1* | 8/2019 | Zaslavsky ........... G06F 16/2308 |

FOREIGN PATENT DOCUMENTS

| | | |
|---|---|---|
| JP | 2000090093 A | 3/2000 |
| JP | 2012190092 A | 10/2012 |

OTHER PUBLICATIONS

Fontoura et al., "Inverted Index Support for Numeric Search," Sep. 12, 2005, pp. 1-22.

Internet Society et al., "With-defaults Capability for NETCONF (RFC6243)," An IP.com Prior Art Database Technical Disclosure, Jun. 1, 2011, pp. 1-53.

McNutt, B., "Waiting for a Black Box", CMG Proceedings, Nov. 2013, pp. 1-9.

Mehl et al., "Combining Different Worlds—A Scalable Multi-Coupling Approach," Sep. 12, 2014, pp. 1-75.

Sabatini et al., "Numerical Search of Bounded Relative Satellite Motion", Nonlinear Dynamics and Systems Theory, 6 (4) (2006) pp. 411-419, Received: Jul. 19, 2005, Revised: Oct. 10, 2006, © 2006 Informath Publishing Group/1562-8353.

Monitoring Device Usage, U.S. Appl. No. 14/447,879, filed Jul. 31, 2014, pp. 1-45.

Monitoring Device Usage, U.S. Appl. No. 14/447,997, filed Jul. 31, 2014, pp. 1-46.

Mehl et al., "Combining Different Worlds—A Scalable Multi-Coupling Approach," University of Stuttgart, Sep. 12, 2014, pp. 1-74.

* cited by examiner

MAINTAINING MANAGEABLE UTILIZATION IN A SYSTEM TO PREVENT EXCESSIVE QUEUING OF SYSTEM REQUESTS

BACKGROUND

The present invention relates to resource utilization of a system, and more specifically, this invention relates to the management of performance problems of the system as indicated by solving a utilization function for the system during measurement periods.

In computer systems, utilization often refers to a usage of processing resources by a system, or the amount of available resources being utilized to execute a current workload. Actual utilization varies depending on the amount and type of managed computing tasks. Certain tasks may require intense system utilization, while others may require significantly less system utilization, such as may be the case when part of a task is allocated to resources outside of the system. In some cases, utilization may be used to gauge the performance of a system. For example, a heavy utilization with only a few running programs may indicate insufficient power support to a system, or running programs hidden by a system monitor. The latter may be a high indicator of viruses or malware present on the system.

SUMMARY

According to one embodiment, a computer-implemented method includes obtaining, during a measurement period, a set of utilization metrics for a system; determining, whether the average number of outstanding system requests N of the system lies between a current and an actual value of the maximum concurrency c; in response to determining that the average number of outstanding system requests N of the system does not lie between the current and actual values of the maximum concurrency c, not adjusting the maximum concurrency value c; in response to determining that the average number of outstanding system requests N of the system does lie between the current and actual values of the maximum concurrency c, assigning a value of the maximum concurrency c to be the value of the average number of outstanding system requests N; accessing a utilization function $U(N, c)$ which satisfies a black box equation for a utilization $\rho$ value of the system; solving the utilization function $U(N, c)$; and managing performance problems of the system indicated by solving the utilization function $U(N, c)$. The utilization metrics for the system includes at least an average number of outstanding system requests N, an average response time R of the system, and a maximum concurrency c that the system is capable of supporting. The utilization function $U(N, c)$ satisfies a predetermined fixed point relationship.

According to another embodiment, a computer program product for maintaining manageable utilization in a device includes a computer readable storage medium having program instructions embodied therewith, wherein the computer readable storage medium is not a transitory signal per se, and the program instructions are readable and/or executable by the device, to cause the device to perform the foregoing method.

According to yet another embodiment, a system, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
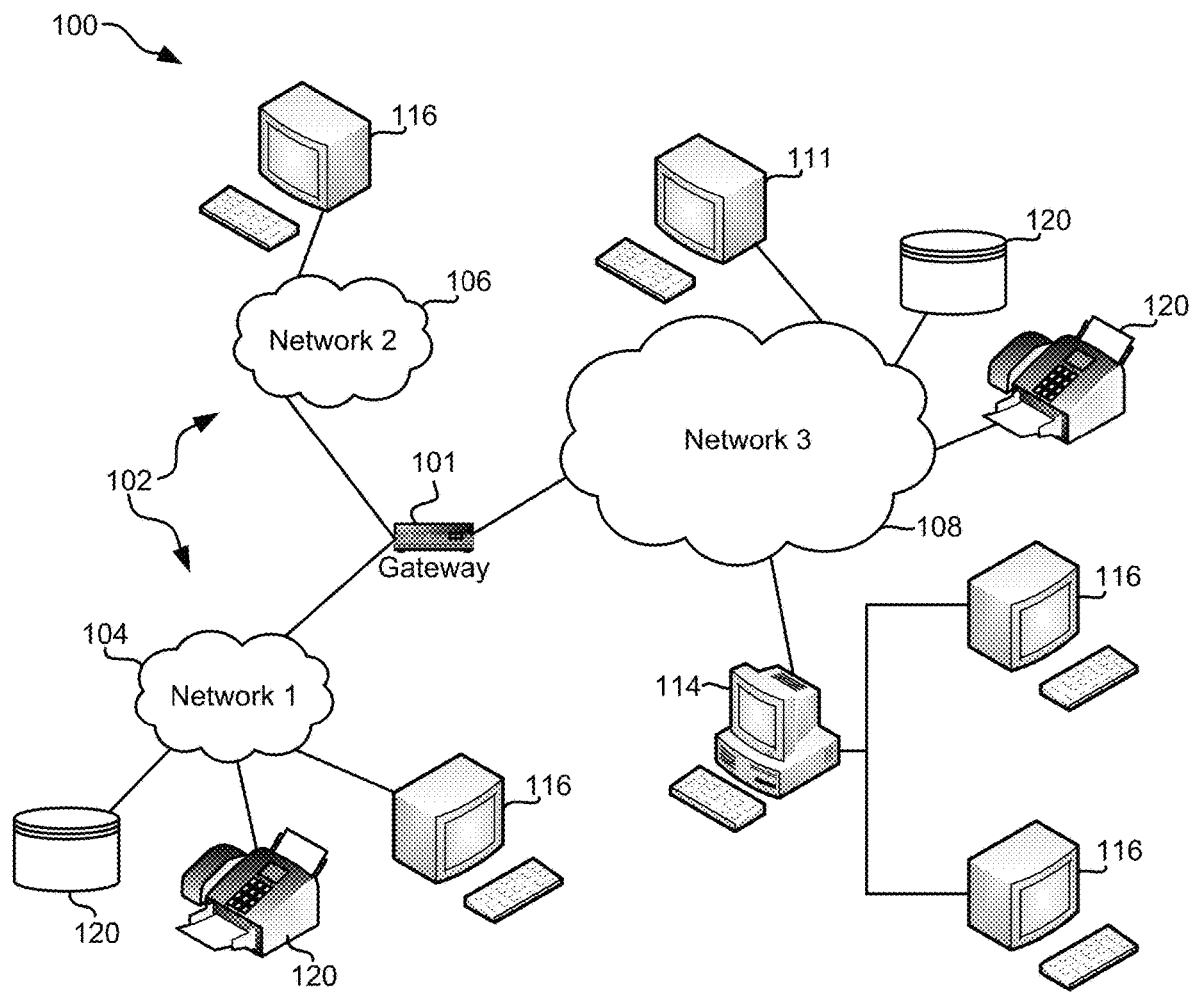
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for managing performance problems of a system as indicated by solving a utilization function for the system during measurement periods.

In one general embodiment, a computer-implemented method includes obtaining, during a measurement period, a set of utilization metrics for a system; determining, whether the average number of outstanding system requests N of the system lies between a current and an actual value of the maximum concurrency c; in response to determining that the average number of outstanding system requests N of the system does not lie between the current and actual values of the maximum concurrency c, not adjusting the maximum concurrency value c; in response to determining that the average number of outstanding system requests N of the system does lie between the current and actual values of the maximum concurrency c, assigning a value of the maximum concurrency c to be the value of the average number of outstanding system requests N; accessing a utilization function $U(N, c)$ which satisfies a black box equation for a utilization $\rho$ value of the system; solving the utilization function $U(N, c)$; and managing performance problems of the system indicated by solving the utilization function $U(N, c)$. The utilization metrics for the system includes at least an average number of outstanding system requests N, an average response time R of the system, and a maximum concurrency c that the system is capable of supporting. The utilization function U(N, c) satisfies a predetermined fixed point relationship.

In another general embodiment, a computer program product for maintaining manageable utilization in a device includes a computer readable storage medium having program instructions embodied therewith, wherein the computer readable storage medium is not a transitory signal per se, and the program instructions are readable and/or executable by the device, to cause the device to perform the foregoing method.

In yet another general embodiment, a system, includes a processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
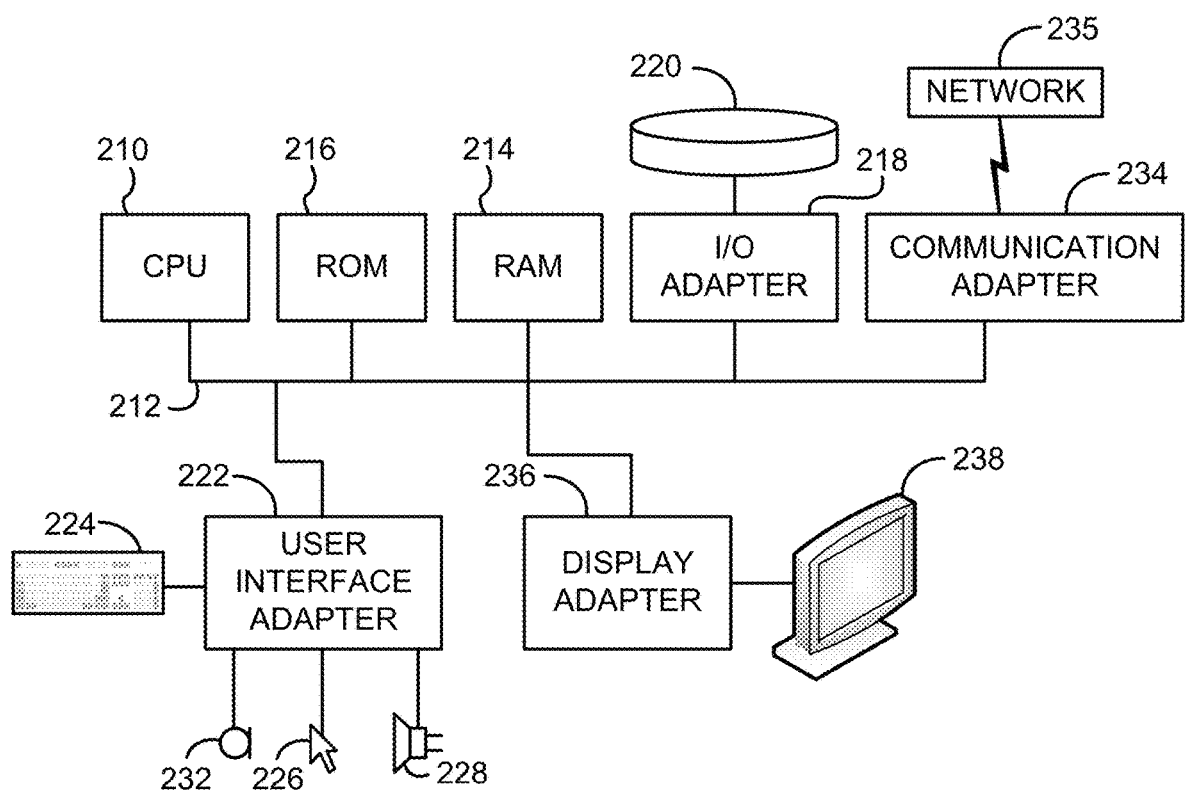
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
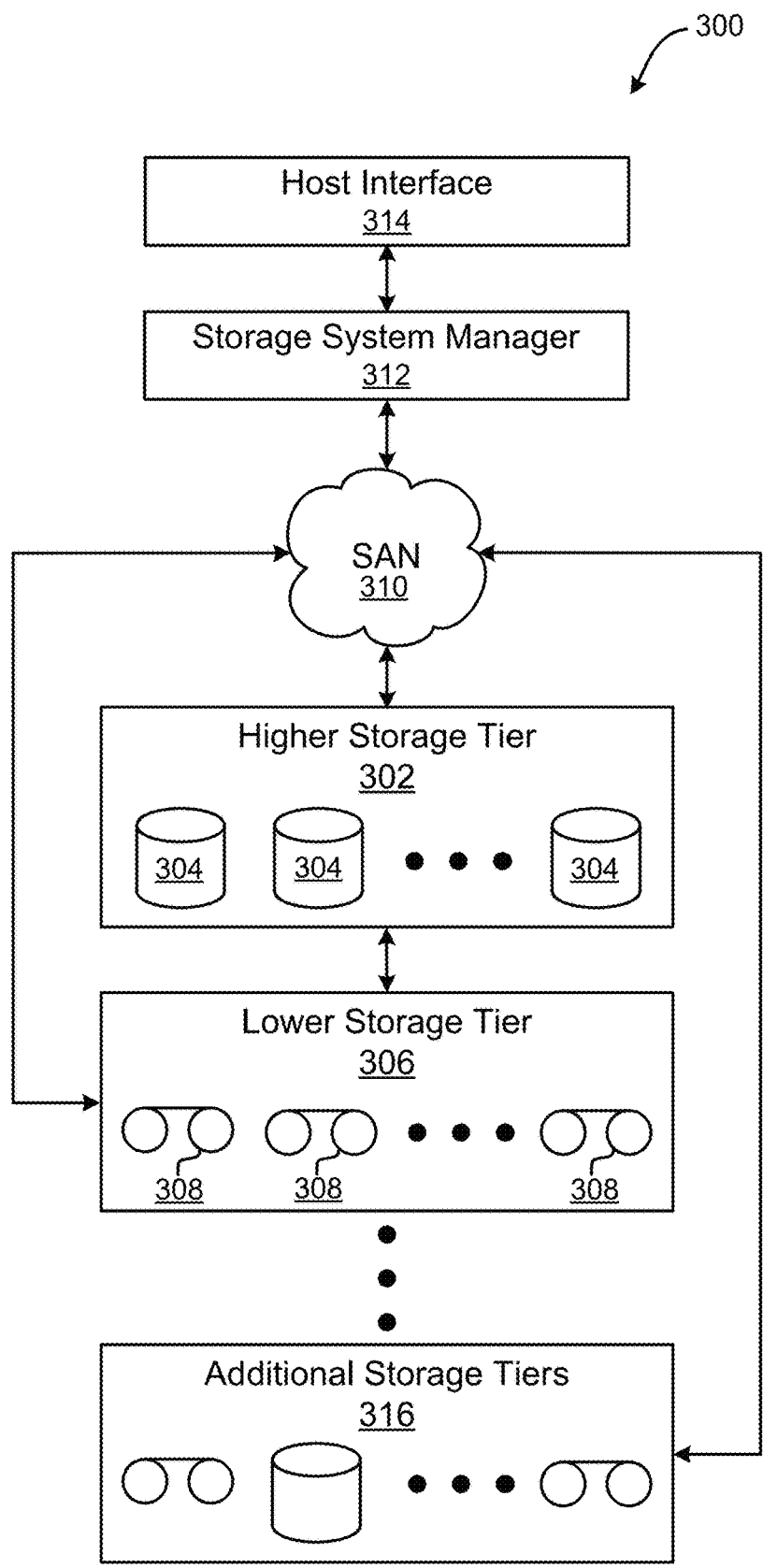
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Processing resources of computer systems often operate using concurrent processing. In concurrent processing, different portions of a computer system's processing potential may be used at the same time. For example, an adapter component of a larger system may experience a load corresponding to various concurrent operations, where each operation uses a portion of the adapter's processing potential. Troubleshooting the utilizations of these separate concurrent processing uses has in the past included using harmonic number analysis and/or cyclic frequency counts.

Various embodiments described herein include evaluating system utilization during a measurement period and managing the system in response to determining less than desirable concurrent system operation. Various embodiments described herein also implement relatively effective/efficient defining of "black box" model fixed point relationships in a system, and thereby enable the system to handle very large levels of system concurrency without having to queue requests received by the system.

Figure 4:
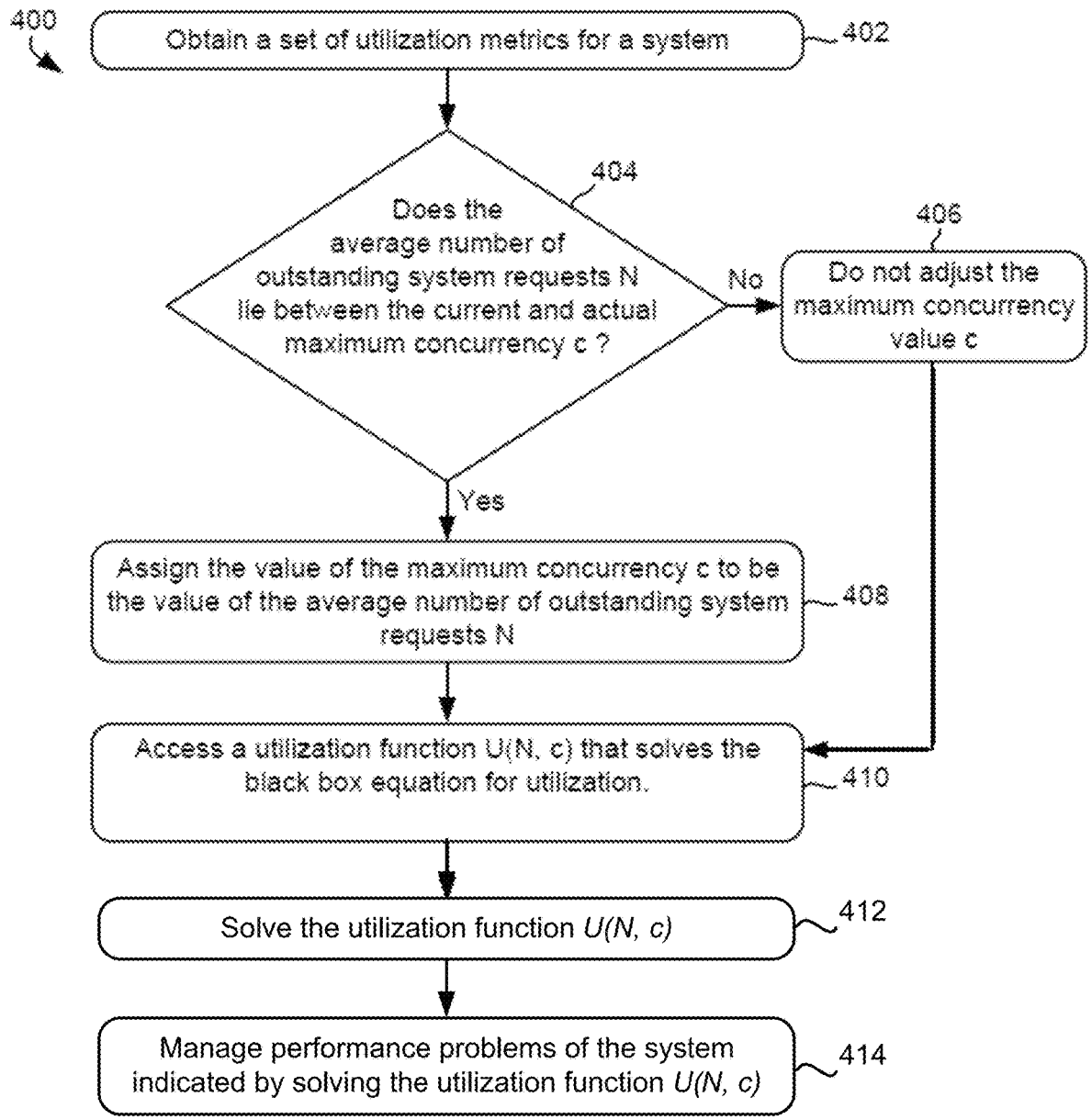
FIG. 4 illustrates a flowchart of a method, in accordance with one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Method 400 may be performed for maintaining a manageable utilization in a system, e.g., where the manageable utilization does not include systems requests being stored for an excessive length of time in a queue before being fulfilled/answered. It should be noted that one or more operations of method 400 may be performed by a device, e.g., such as by a processor of the device. According to one embodiment, the device may be a component of the system, e.g., such as one or more processors thereof. According to another embodiment, the device may be a remote device in communication with the system, e.g., via a network connection.

According to various embodiments, method 400 may be performed in a system that is and/or is capable of implementing the General Purpose Utilization Monitor (GPUM). According to one embodiment, the GPUM may be designed to support a variety of operational platforms and not necessarily have access to a full math library during operation. For purposes of simplicity, however, method 400 and/or other embodiments described elsewhere herein describe a GPUM algorithm which may use such a library during operation.

The GPUM may be a dynamic monitor that gathers periodic measurements of system operation. As will be described by the various operations of method 400, after one or more measurement periods, the current estimate of maximum system concurrency c may be re-examined and/or may be adjusted to better reflect current operational conditions. An estimate may then be produced of the system utilization $\rho$ that occurred during the measurement period of the system. The system utilization $\rho$ value may be used to identify performance problems in the system, where such problems may thereafter be managed accordingly.

To support one or more of these calculations and/or estimations operation 402 of method 400 includes obtaining, e.g., by the device, during a measurement period, a set of utilization metrics for a system. The obtained system utilization metrics may be any type of utilization metrics. The system utilization metrics may be obtained by any type of monitoring technique during a measurement period of the system. According to one approach, the system utilization metrics may be received by the device during the measurement period of the system. According to another approach, the system utilization metrics may be measured by the system during the measurement period of the system, and sent to the device.

According to various embodiments, the utilization metrics for the system may include one or more of an average number of outstanding system requests N, an average response time R of the system, and a maximum concurrency c that the system is capable of supporting, e.g., the maximum number of concurrent requests that the system can process without using a queue. According to another embodiment, the utilization metrics for the system may include an average response time s for the subset of requests that were made when the number of outstanding requests was no larger than c−1. The utilization metrics for the system may vary depending on the embodiment.

Various embodiments and/or methods may be used for measuring the average number of outstanding requests N. According to one preferred embodiment, the average number of outstanding requests N is measured by measuring a rate per second of requests V in the system during the measurement period of the system. The measured rate per second of requests V value may be used in Little's Law, N=VR, to calculate the average number of outstanding requests N (in such a calculation, the average response time R of the system would be known from the obtaining of operation 402).

It should be noted that according to various embodiments, an average number of outstanding requests N additionally and/or alternatively may be calculated on an application by application basis, such as for support for Quality of Service (QoS) of the system. An average number of outstanding requests $N_i$ for application i may be calculated using similar calculations that are specific to each system application i, where the system may include any number of system applications, e.g., i∈{0, 1, . . . , n}. To support QoS, the following additional performance data may be obtained: $N_i$=average number of outstanding requests for application i, and $R_i$=average response time for application i. In one approach, the overall utilization of the system may be divided between the applications of the system in accordance with standard requests associated with each application.

Such calculations may be important for determining which portion of a system (such as an application of the system) is underperforming, e.g., experiencing a virus, bogged down with a large number of application requests, stuck in a software phase-locked loop, etc.

Referring again to method 400, according to various embodiments, to perform the analysis of each measurement period, the GPUM may use a black box model of system queueing behavior. In particular, according to one approach, the device, e.g., using a GPUM, may determine the utilization ρ value that satisfies the black box equation for utilization:

$$N = \frac{c\rho}{1 - \rho^c} \qquad (1)$$

In other approaches, any one or more known black box equations may additionally and/or alternatively be used. As part of implementing that approach, the utilization function U(N, c) may be computed, such that equation (1) is satisfied by taking ρ=U(N, c). The utilization function U may be predefined. The utilization function U will be described/solved in greater detail elsewhere herein, e.g., see operation 410.

According to various embodiments, at a time of system initialization, the maximum system concurrency c may be initialized to some value, which depending on the embodiment, may be subsequently adjusted. The maximum system concurrency c may be a predetermined value. With the maximum concurrency c initialized, the device, e.g., using a GPUM, may perform any one or more of the operations of method 400 using the performance statistics obtained in operation 402 for each corresponding measurement period.

Decision 404 includes determining whether the average number of outstanding system requests N of the system lies between the current and actual values of the maximum concurrency c that the system is capable of supporting.

According to various embodiments, determining whether the average number of outstanding system requests N of the system lies between the current and actual values of the maximum concurrency c that the system is capable of supporting may include comparing the sign of the difference of the average number of outstanding system requests N and the current maximum concurrency c, sgn(N−c), to the sign of a predetermined polynomial. According to one approach, the predetermined polynomial may be represented by equation (2) as follows:

$$\text{Polynomial} = 1 - M^c - M \qquad (2)$$

where M=s/R, where s is the value of the average response time for a subset of requests that were made when the number of outstanding requests was no larger than the maximum concurrency c, less 1. The condition that N lies between the current and actual values of c corresponds to the case where the two signs just described differ from each other.

In response to determining that the average number of outstanding system requests N of the system does not lie between the current and actual values of c (as illustrated by the "No" logical path leading from decision 404), the maximum concurrency value c may not be adjusted, e.g., see operation 406.

According to method 400, the average number of outstanding system requests N of the system may alternatively be determined to lie between the current and actual values of c (as illustrated by the "Yes" logical path leading from decision 404). Using the black box model, the current value of the maximum concurrency c can then be improved by using N in its place.

In response to determining that the average number of outstanding system requests N of the system lies between the current and actual values of c, the value of the maximum concurrency c may be assigned to be the value of the average number of outstanding system requests N, e.g., see operation 408. Assigning the value of the maximum concurrency c to be the value of the average number of outstanding system requests N may serve as a first estimation of a new value for the maximum concurrency c that would result in more correct estimates of the system utilization as seen in subsequent intervals.

Operation 410 of method 400 includes accessing a utilization function U(N, c) that solves the black box equation for utilization, e.g., see Equation (1).

The utilization function U(N, c) may include any functional constraints and/or variables and may be computed in various ways, including the specific methods provided below.

Referring again momentarily to embodiments in which utilization is determined by the device for each application, e.g., when additionally and/or alternatively monitoring QoS of the system, the utilization of each application may be determined by the device using: $\rho_i = U(N,c)N_i/N$, i∈{0, 1, . . . , n}, where i corresponds to each of any one or more applications. According to various embodiments, the estimated utilizations $\rho_i$ of each application may be used, e.g., by the device, to perform analysis of the system during each measurement period. The device may use similar operations to those of method 400 to perform such analysis.

According to various embodiments, a calculated tipping point may be used in calculating the utilization function U(N, c). Accordingly, method 400 may include determining a tipping point $N_{tip}$ corresponding to the system concurrency c. The tipping point $N_{tip}$ may correspond to the average number of outstanding system requests N. According to various embodiments the determined tipping point $N_{tip}$ may be used when determining an estimation of the utilization $\rho$ value of the system.

The desired utilization $\rho$ value may be an attractive fixed point that satisfies the equation:

$$x = \frac{N}{N + f(x)} \quad (3)$$

where $$f(x) = \begin{cases} c\dfrac{1 - (\gamma - \gamma x^c + \beta x)}{1 - (\gamma - \gamma x^c + \beta x)^c} & \text{if } N \leq N_{tip} \\ c\dfrac{1 - (\beta - \gamma x + \alpha x^c)^{1/c}}{1 - (\beta - \gamma x + \alpha x^c)} & \text{if } N > N_{tip} \end{cases} \quad (4)$$

and where $0 \leq x \leq 1$; $\alpha = c^2/(c^2 + N^2)$; $\beta = N^2/(c^2 + N^2)$; $\gamma = cN/(c^2 + N^2)$ and $N_{tip} = (c+1)^{(c-1)/c}$.

Operation 412 of method 400 includes solving the utilization function U(N, c). One method of accomplishing this is by using the predefined fixed point relationship (3). The predefined fixed point relationship (3) may exhibit rapid convergence toward the fixed point. Because of that behavior, the right side of (3) improves upon a given estimate x of the quantity U(N, c).

According to one approach, the expression $N/(L+\delta+1)$ may be used as an initial value for the function U(N, c) where $\delta = c - N_{tip}$ and $L = \max(N, N_{tip} - 1)$. This initial value would define the utilization function U(N, c) as follows:

$$U(N, c) = \frac{N}{N + f\left(\dfrac{N}{N + f\left(\dfrac{N}{(L+\delta+1)}\right)}\right)} \quad (5)$$

According to other approaches, the initial value used for the function $f(x)$ when solving the utilization function U(N, c) may be a number whose approximate value is similar to that of $N/(L+\delta+1)$. According to one approach, the initial value used for the function $f(x)$ when solving the utilization function U(N, c) may include the expression: $\min(N_{tip}/(c+1), N/c)$. According to another approach, the initial value used for the function $f(x)$ when solving the utilization function U(N, c) may include the expression: $N/\max(c, N+1+H_{c+2}-H_3)$. According to yet another approach, the initial value used for the function $f(x)$ when solving the utilization function U(N, c) may include the expression and $N L/(L^2+N+\delta N_{tip})$. In such approaches, H is a harmonic number.

With joint reference to the present approaches and the evaluation of the utilization function U(N, c) in terms of a fixed point relationship, e.g., Equation (3), the utilization function U(N, c) may be represented by at least two cases, which are distinguished by comparing N against $N_{tip}$. The two cases may additionally and/or alternately be distinguished by comparing N against a predetermined threshold (herein "$N_{thresh}$") that has a similar numeric value. For example, assuming that the initial value of $\min(N_{tip}/(c+1), N/c)$ is used as the initial value of the function $f(x)$ when solving the utilization function U(N, c), as previously described, it may be reasonable to compare N against the value:

$$N_{thresh} = N_{tip} c/(c+1) \quad (6)$$

as this may bring the threshold for N into alignment with the transition that occurs between the two branches of the "min" function.

According to various embodiments, at least one of the coefficients $\alpha$, $\beta$ and $\gamma$ may be applied as trigonometric functions applied to a line that extends from an origin, when solving the utilization function U(N, c). According to one embodiment, the line that extends from an origin may have a slope of N/c. An advantage of representing and/or using at least one of the coefficients of the utilization function U(N, c) as trigonometric functions may be that the utilization function U(N, c) may be represented/stated as a single formula, rather than separate formulas. The trigonometric function may be mathematically equivalent to the previously described non-trigonometric utilization function U(N, c). According to one approach, the trigonometric function may be represented as follows:

$$f(x) = c\frac{1 - (\vec{v} \cdot \vec{w}(x))^{c-Z}}{1 - (\vec{v} \cdot \vec{w}(x))^{c1-Z}} \quad (7)$$

where $$Z = \lfloor N/\max(N, N_{tip}) \rfloor$$

$$\theta = \left| \frac{1}{2}Z\pi - \arctan\frac{N}{c} \right|$$

$$\vec{v} = \left( \sin^{1-Z}\theta \cos^{1+Z}\theta, -\frac{1}{2}\sin 2\theta, \sin^2\theta \right)$$

$$\vec{w}(x) = \left( 1, x^{c1-Z}, x^{cZ} \right)$$

Operation 414 of method 400 includes managing, by the device, performance problems of the system indicated by solving the utilization function U(N, c). Managing performance problems of the system may include performing any one or more managing actions.

According to one embodiment, managing performance problems of the system may include identifying, by the device, components of the system that exhibit a high utilization. According to another embodiment, managing performance problems of the system may include instructing, by the device, adjusting of the system, e.g. to balance the utilization across available components. Such adjusting may include reassigning, by the device, a number of concurrent operations that the system may receive, where the reassigning is based on the determined utilization value $\rho$.

According to yet another embodiment, managing performance problems of the system may include the device instructing re-booting the system and/or one or more applications of the system. Rebooting may be useful for ending any use of components of the system that are unnecessarily contributing to a relatively high system utilization, e.g., stuck in a software phase-locked loop.

According to another embodiment, managing performance problems of the system may include instructing, by the device, performance of virus detection on components of the system that exhibit a high utilization. The high utilization of the system component may correspond to the system component experiencing a virus. According to yet another embodiment, managing performance problems of the system may include instructing, by the device, performance of virus correction on components of the system that are determined to be experiencing a virus. According to another embodiment, managing performance problems of the system may include scheduling, by the device, a delay of one or more system requests.

Managing performance problems of the system may improve system performance, by preventing a system or portions of the system, from receiving an amount of system requests that would be added to a queue in response to the system already performing a maximum amount of operations. Receiving an amount of requests that are not subject to being queued is ensured by monitoring the utilization of the system and managing the thereafter discovered performance problems of system.

In some system environments, e.g., such as an embedded system, the direct use of Equation (5) may not be preferred. This is because Equation (5) may use transcendental operations. According to one embodiment, one or more embodiments of U.S. application Ser. No. 14/937,999 filed Nov. 11, 2015, which is herein incorporated by reference, may be referenced to provide an evaluation method which may be applied using four operation arithmetic only. Such evaluation methods may be initiated by performing an approximate calculation of the quantity $N_{tip}$. These methods of obtaining $N_{tip}$ may however rely on determining the harmonic number $H_{c+2}$.

Various embodiments which include an extension of the earlier calculation method will now be described. In such embodiments, the calculation of $N_t$ may be performed by referring to the binary representation of the number $c+2$. Such embodiments may ensure that any evaluation of the utilization function U(N, c) will be efficient regardless of the underlying concurrency of the system.

Assume for purposes of an example that $x \geq 1$, and moreover assume that a binary representation of the number x is available. Then (regardless of the exact binary format) it may be computationally simple to represent x in the form $x=q2^p$, where p is nonnegative integer and $1 \leq q < 2$. In addition to these representations, assume that g(x) is defined as follows:

$$g(x) = (p+q)\ln(2) + \frac{1}{2x} \quad (8)$$

It may be observed that ln(2) is a constant, and hence g(x) may be computed using four operation arithmetic if desirable.

Using the function g(x) which is defined in Equation (8), the device may operate, e.g., via use of a GPUM, based upon adopting the illustrative values as follows:

$$\delta = g(c+2) - g(3) \quad (9)$$

and $$N_{tip} = c - \delta \quad (10)$$

in substitute to the values and/or formulas that $\delta$ and/or $N_{tip}$ were assigned to in other embodiments described herein, e.g., such as in method 400.

Using such assumptions and/or assignments, the utilization function U(N, c) may be computed within one percentage point, using the following equation:

$$U(N, c) \approx \frac{N}{\eta + h(h(N/\eta)) + \delta h(N_{tip}/\eta)} \quad (11)$$

where $\eta = \max(N, N_{tip})$ and $$h(x) = x - \delta x(1-x) + \tfrac{1}{2}\delta(\delta-1)x(1-x)^2 \quad (12)$$

Finally, one or more operations of method 400 may be used to determine the sign of the polynomial $1-M^c-M$ to prevent system request queuing. Devices that are limited to and/or prefer the use of four arithmetic operations only, may determine this sign by referring instead to the sign of the quantity U(c, c)−M, where the value of the utilization function U(N, c) may be determined, e.g., by a device, using one or more of the Equations (8)-(12). According to various approaches, within the framework of the black box model, the signs of these two quantities may be identical.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for maintaining manageable utilization in a device, the computer program product comprising a computer readable storage medium having program instructions embodied therewith, wherein the computer readable storage medium is not a transitory signal per se, the program instructions readable and/or executable by the device, to cause the device to perform a method comprising:

obtaining, by the device, during a measurement period, a set of utilization metrics for a system, wherein the utilization metrics for the system includes at least an average number of outstanding system requests N, an average response time R of the system, and a maximum concurrency c, the maximum concurrency c being a maximum number of concurrent requests that the system is capable of processing without using a queue;

determining, by the device, whether the average number of outstanding system requests N of the system lies between a current estimated value of the maximum concurrency c and an actual value of the maximum concurrency c;

in response to determining that the average number of outstanding system requests N of the system does not lie between the current estimated value of the maximum concurrency c and the actual value of the maximum concurrency c, not adjusting, by the device, the maximum concurrency value c;

in response to determining that the average number of outstanding system requests N of the system does lie between the current estimated value of the maximum concurrency c and the actual value of the maximum concurrency c, assigning, by the device, a value of the maximum concurrency c to be the value of the average number of outstanding system requests N;

accessing, by the device, a utilization function which satisfies a black box equation for a utilization ρ value of the system;

solving, by the device, the utilization function, wherein the utilization function satisfies a predetermined fixed point relationship; and managing, by the device, performance problems of the system indicated by the solving of the utilization function, wherein managing performance problems includes: identifying components of the system that exhibit a high utilization and/or instructing performance of an action on components of the system that exhibit a high utilization.

2. The computer program product of claim 1, the program instructions readable and/or executable by the device, to cause the device to perform the method comprising determining, by the device, a tipping point $N_{tip}$ corresponding to the average number of outstanding system requests N; and using the determined tipping point $N_{tip}$ when determining an estimation of the utilization ρ value of the system.

3. The computer program product of claim 2, wherein the utilization function is defined as: $x=N/N+f(x)$, where:

$$f(x)=c((1-(\gamma-\gamma x^c+\beta x))/(1-(\gamma-\gamma x^c+\beta x)^c)) \text{ for } N \leq N_{tip},$$

$$f(x)=c((1-(\beta-\gamma x+\alpha x^c)^{1/c})/(1-(\beta-\gamma x+\alpha x^c))) \text{ for } N > N_{tip},$$

wherein $0 \leq x \leq 1$; $\alpha=c^2/(c^2+N^2)$; $\beta=N^2/(c^2+N^2)$; $\gamma=cN/(c^2+N^2)$ and $N_{tip}=(c+1)^{(c-1)/c}$.

4. The computer program product of claim 3, wherein an expression $N/(L+\delta+1)$ is an initial value used for the function $f(x)$, where $\delta=c-N_{tip}$ and $L=\max(N, N_{tip}-1)$.

5. The computer program product of claim 4, wherein an initial value for $f(x)$ includes an expression selected from a group of expressions consisting of: $\min(N_{tip}/(c+1), N/c)$; $N/\max(c, N+1+H_{c+2}-H_3)$ and $NL/(L^2+N+\delta N_{tip})$, wherein H is a harmonic number.

6. The computer program product of claim 4, wherein at least one of the coefficients α, β and γ are applied as trigonometric functions applied to a line that extends from an origin, wherein the line has a slope of N/c, and wherein $$f(x) = c\left(\left(1-(\vec{v}*\vec{w}(x))^{c^{1-z}}\right)\Big/\left(1-(\vec{v}*\vec{w}(x))^{c^{1-z}}\right)\right),$$

$$Z = \lfloor N/\max(N, Ntip)\rfloor; \Theta = \left|\frac{1}{2}Z\Pi - \arctan\frac{N}{c}\right|;$$

$$\vec{v} = \left(\sin^{1-Z}\Theta\cos^{1+Z}\Theta, -\frac{1}{2}\sin 2\Theta, \sin^2\Theta\right); \vec{w}(x) = (1, x^{c^{1-z}}, x^{c^Z}).$$

7. The computer program product of claim 1, wherein managing performance problems of the system includes performing, by the device, at least one action selected from the group of managing actions consisting of:

instructing, by the device, adjusting of the system;
instructing, by the device, the system to reboot;
instructing, by the device, performance of virus detection on components of the system that exhibit a high utilization; and
instructing, by the device, performance of virus correction on components of the system that are determined to be experiencing a virus.

8. The computer program product of claim 1, wherein the device is a component of the system.

9. The computer program product of claim 1, wherein the device is a remote device in communication with the system.

10. A computer-implemented method for maintaining manageable utilization in a device, comprising:

obtaining, during a measurement period, a set of utilization metrics for a system, wherein the utilization metrics for the system includes at least an average number of outstanding system requests N, an average response time R of the system, and a maximum concurrency c, the maximum concurrency c being a maximum number of concurrent requests that the system is capable of processing without using a queue;

determining, whether the average number of outstanding system requests N of the system lies between a current estimated value of the maximum concurrency c and an actual value of the maximum concurrency c;

in response to determining that the average number of outstanding system requests N of the system does not lie between the current estimated value of the maximum concurrency c and the actual value of the maximum concurrency c, not adjusting the maximum concurrency value c;

in response to determining that the average number of outstanding system requests N of the system does lie between the current estimated value of the maximum concurrency c and the actual value of the maximum concurrency c, assigning a value of the maximum concurrency c to be the value of the average number of outstanding system requests N;

accessing a utilization function which satisfies a black box equation for a utilization ρ value of the system;

solving the utilization function, wherein the utilization function satisfies a predetermined fixed point relationship; and managing performance problems of the system indicated by the solving of the utilization function, wherein managing performance problems includes: identifying components of the system that exhibit a high utilization and/or instructing performance of an action on components of the system that exhibit a high utilization.

11. The computer-implemented method of claim 10, comprising determining a tipping point $N_{tip}$ corresponding to the average number of outstanding system requests N; and using the determined tipping point $N_{tip}$ when determining an estimation of the utilization ρ value of the system.

12. The computer-implemented method of claim 11, wherein the utilization function is defined as: $x=N/N+f(x)$, where:

$f(x)=c((1-(\gamma-\gamma x^c+\beta x))/(1-(\gamma-\gamma x^c+\beta x)^c))$ for $N\le N_{tip}$, $f(x)=c((1-(\beta-\gamma x+\alpha x^c)^{1/c})/(1-(\beta-\gamma x+\alpha x^c)))$ for $N>N_{tip}$, wherein $0\le x\le 1$; $\alpha=c^2/(c^2+N^2)$; $\beta=N^2/(c^2+N^2)$; $\gamma=cN/(c^2+N^2)$ and $N_{tip}=(c+1)^{(c-1)/c}$.

13. The computer-implemented method of claim 12, wherein an expression $N/(L+\delta+1)$ is an initial value used for the function f(x), where $\delta=c-N_{tip}$ and $L=\max(N, N_{tip}-1)$.

14. The computer-implemented method of claim 13, wherein an initial value for f(x) includes an expression selected from a group of expressions consisting of: $\min(N_{tip}/(c+1), N/c)$; $N/\max(c, N+1+H_{c+2}-H_3)$ and $NL/(L^2+N+\delta N_{tip})$, wherein H is a harmonic number.

15. The computer-implemented method of claim 13, wherein at least one of the coefficients $\alpha$, $\beta$ and $\gamma$ are applied as trigonometric functions applied to a line that extends from an origin, wherein the line has a slope of N/c, and wherein $$f(x) = c\left(\left(1-(\vec{v}*\vec{w}(x))^{C-z}\right)\bigg/\left(1-(\vec{v}*\vec{w}(x))^{C1-z}\right)\right),$$

$$Z = \lfloor N/\max(N, N_{tip})\rfloor; \Theta = \left|\frac{1}{2}Z\Pi - \arctan\frac{N}{c}\right|;$$

$$\vec{v} = \left(\sin^{1-Z}\Theta\cos^{1+Z}\Theta, -\frac{1}{2}\sin 2\Theta, \sin^2\Theta\right); \vec{w}(x) = \left(1, x^{C1-z}, x^{CZ}\right).$$

16. The computer-implemented method of claim 10, wherein managing performance problems of the system includes performing at least one action selected from the group of managing actions consisting of:
   instructing adjusting of the system;
   instructing the system to reboot;
   instructing performance of virus detection on components of the system that exhibit a high utilization; and
   instructing performance of virus correction on components of the system that are determined to be experiencing a virus.

17. A system for maintaining manageable utilization in a device, comprising:
   a processor; and
   logic integrated with the processor, executable by the processor, or integrated with and executable by the processor, the logic being configured to:
   obtain, during a measurement period, a set of utilization metrics for a system, wherein the utilization metrics for the system includes at least an average number of outstanding system requests N, an average response time R of the system, and a maximum concurrency c, the maximum concurrency c being a maximum number of concurrent requests that the system is capable of processing without using a queue;
   determine, whether the average number of outstanding system requests N of the system lies between a current estimated value of the maximum concurrency c and an actual value of the maximum concurrency c;
   in response to determining that the average number of outstanding system requests N of the system does not lie between the current estimated value of the maximum concurrency c and the actual value of the maximum concurrency c, not adjust the maximum concurrency value c;
   in response to determining that the average number of outstanding system requests N of the system does lie between the current estimated value of the maximum concurrency c and the actual value of the maximum concurrency c, assign a value of the maximum concurrency c to be the value of the average number of outstanding system requests N;
   access a utilization function which satisfies a black box equation for a utilization $\rho$ value of the system;
   solve the utilization function, wherein the utilization function satisfies a predetermined fixed point relationship; and
   manage performance problems of the system indicated by the solving of the utilization function, wherein managing performance problems includes: identifying components of the system that exhibit a high utilization and/or instructing performance of an action on components of the system that exhibit a high utilization.

18. The system of claim 17, wherein the logic is configured to: determine a tipping point $N_{tip}$ corresponding to the average number of outstanding system requests N; and using the determined tipping point $N_{tip}$ when determining an estimation of the utilization $\rho$ value of the system.

* * * * *